United States Patent Office 3,097,163
Patented July 9, 1963

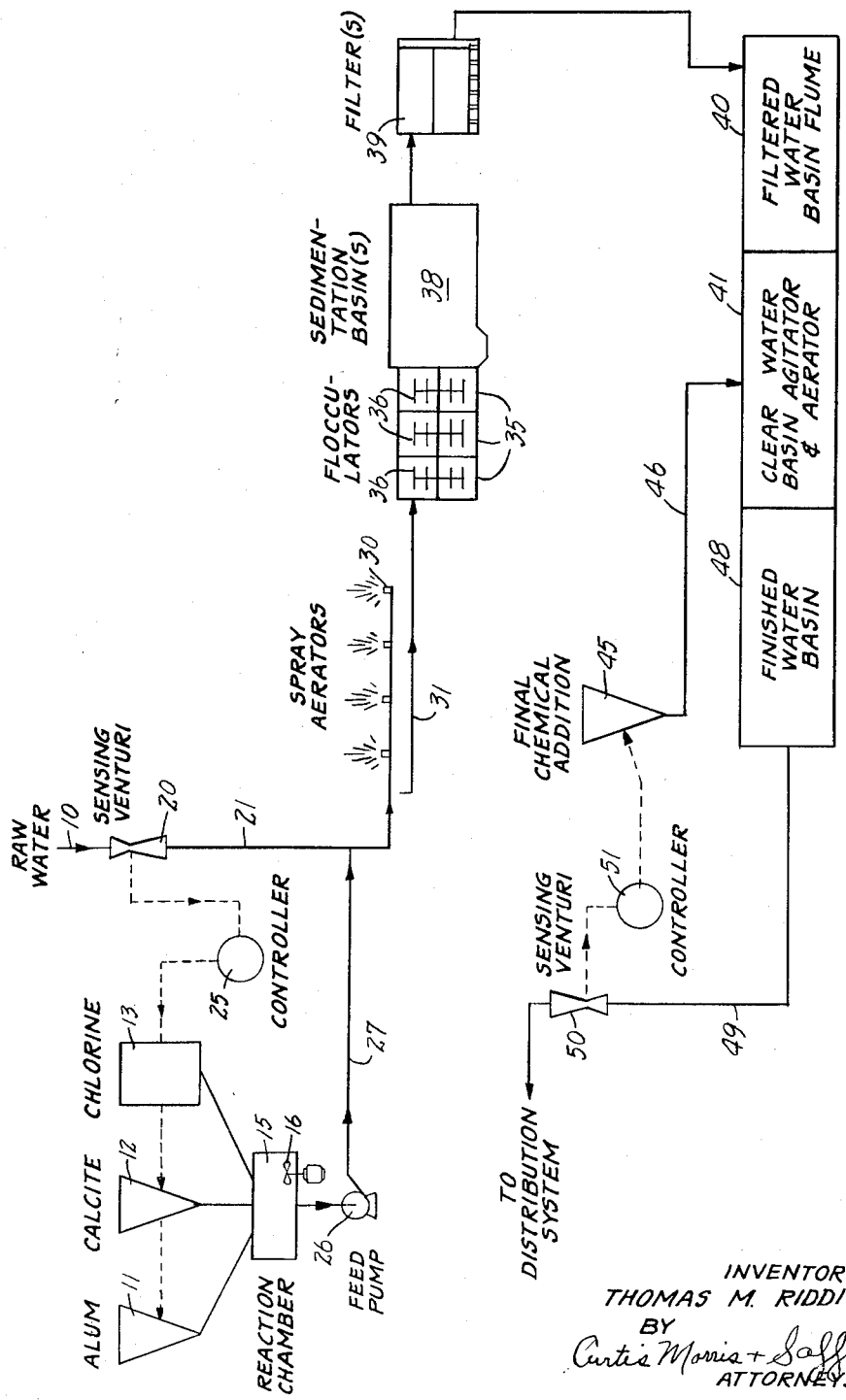

3,097,163
TREATMENT OF WATER IN MUNICIPAL AND INDUSTRIAL WATER SYSTEMS
Thomas Moore Riddick, 369 E. 149th St., New York 55, N.Y.
Filed Aug. 25, 1958, Ser. No. 757,073
8 Claims. (Cl. 210—53)

This invention relates to water treatment in municipal and industrial water systems and, more particularly, to a system for the treatment and purification of water whereby enhancing efficiency of chemicals and easier and more advantageous pH control is achieved with the compositions, methods, and apparatus for practicing this invention.

The chemical treatment and/or purification of water from reservoirs, ponds, lakes, streams, rivers and the like, conventionally includes attempts to achieve a variety of end results by chemical additions to the water prior to distribution thereof through a municipal or industrial distribution system. For example, it is conventional to add to the water a coagulant or flocculating agent, such as aluminum sulfate or ferric sulfate, or ferric chloride, etc., to form therein a flocculant precipitation which will remove by adsorption or other mechanics iron and manganese materials, sand, silt, loam, micro-organisms, etc., which may contaminate, discolor or turbidify the natural or raw water. Similarly, but for other purposes, alkaline materials may be added to the water not only to aid the flocculating reaction but also for the inhibition of corrosion on the distribution pipe system, and, as is well-known, chlorine may be added in a variety of forms for purification or sterilization purposes.

In order to correlate or achieve these several varied goals by the addition of various chemicals to produce various reactions in the water, difficulty may be experienced from the fact that optimum pH, stoichiometric, and other conditions in the system, when at an optimum for one desired reaction, may be at a disadvantageous or deterring point for other desired independent reactions.

For example, if aluminum sulfate is utilized as the coagulant or flocculating agent, its optimum effect in this regard is achieved by a reaction with calcium bicarbonate present in the water, and this reaction goes most desirably to completion if aluminum hydroxide as one resultant thereof is precipitated from solution in the water. The isoelectric point for the solubility of aluminum hydroxide, however, may be a pH which is readily exceeded by natural alkalinity and/or the addition of other alkaline chemicals to the water either for other reasons or to achieve a bicarbonate concentration sufficient for the desired flocculant formation. Similarly, separate additions of chlorine, as may be for completely independent reasons, may create ancillary problems of alkalinity control and otherwise which are inimical to achieving the desired coagulant results in the most efficient and most economical manner.

According to this invention, however, it has been discovered that optimum pH control is obtained for the various independent reactions desired in water purification systems and that, indeed, by the synergistic admixture and interaction of various compositions upon being added to the raw or untreated water, the independent effects of conventionally separate reactions can be coordinated and combined to produce enhanced results and greater economy of chemical use with the elimination or control of factors heretofore considered inconsistent among the various desired reactions.

One object of this invention is to provide a system of the character described for interrelated chemical treatment to achieve flocculation, chlorination, and alkalinity control of natural water in water purification systems.

Another object of this invention is to provide a system and apparatus for the treatment, purification, and filtration of natural water wherein optimum alkalinity control for flocculation, chlorination, and filtration are achieved by cooperating chemical reactions of compositions added to the water.

A further object of this invention is to provide compositions of the character described for addition to and reaction in natural water in water purification systems to obtain therein optimum control of alkalinity and other conditions which may variously affect a number of different chemical reactions which it is desired to produce in water.

Still another object of this invention is to provide methods of the character described whereby a number of different and conventionally inconsistent chemical reactions are made to occur and to go toward completion to an enhanced extent notwithstanding that the optimum conditions for one reaction may be inimical to the completion of another reaction if carried on separately instead of as combined according to this invention.

Other objects and advantages will be apparent from the following description, the accompanying drawing, and the appended claims.

The drawing is a diagrammatic or schematic flow sheet representation of a municipal water purification or treatment plant embodying and for practicing this invention.

Experience indicates that it is usually necessary to apply some type of alkaline reagent to practically all natural water, either to raise the alkalinity of the raw water to a point sufficient for efficient coagulation purification or to raise the alkalinity of finished or treated water for the purpose of inhibiting corrosion in the distribution system. For example, rain water as it falls may contain carbon dioxide in, perhaps, concentrations of the order of 0.8 p.p.m., whereas as the rain water works through layers of soil, it may pick up from 20 to 50, and from swampy drainage areas sometimes 100 p.p.m. concentrations of carbon dioxide, which, of course, form carbonic acid with the water, thus greatly increasing the tendency of the water to dissolve minerals from the soil. This same type of reaction also produces a certain, though widely varying, concentration of calcium bicarbonate by reacting with the alkaline earths through which subsurface water flows which is essential for the desired coagulation reaction with coagulants such as aluminum sulfate.

That is, the desired reaction with aluminum sulfate to produce a flocculant precipitate of the desired materials from the raw water is as follows:

(1) $Al_2(SO_4)_3 + 3Ca(HCO_3)_2 \rightarrow$ 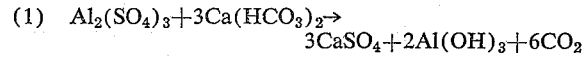
$3CaSO_4 + 2Al(OH)_3 + 6CO_2$ Pure crystalline aluminum sulfate has 18 molecules of water of crystallization and a molecular weight of 666. The commercial form of alum, however, usually employed for water treatment contains approximately 14.2 molecules of water of crystallization and has a molecular weight of approximately 600. Accordingly, considering alkalinity in this respect as in terms of calcium carbonate equivalents, it appears from Equation 1 that 1 p.p.m. aluminum sulfate requires 0.5 p.p.m. calcium bicarbonate, and upon reacting produces 0.68 p.p.m. calcium sulfate (which remains in solution), 0.26 p.p.m. aluminum hydroxide (the basis of the gelatinous floc which settles out in the sedimentation basin carrying with it the various impurities it is desired to remove), and 0.44 p.p.m. carbon dioxide.

In such a system, then it would appear necessary to have at least half as much calcium bicarbonate as alum. Considering, then, a conventional alum dosage of 30 p.p.m. and 15 p.p.m. bicarbonate to be required, according to the law of mass action, the reaction rate is proportional to the molecular concentration of each reacting substance, so the reaction of Equation 1 would not be expected to go to completion unless an excess of about 5 p.p.m. carbonate were present. Thus, a dosage of 30 p.p.m. alum would require at least 20 p.p.m. calcium carbonate.

When the raw water alkalinity is less than about 20 p.p.m., some type of alkali is required to be added to augment this deficiency and usually is chosen from among the commercial alkalis available, so that soda ash and lime have been conventionally employed. Regardless of the cost or rate of application, some difficulty may be experienced using either lime (which is a hydrate) or soda ash (a carbonate), primarily because the alkalinity for the reaction according to Equation 1 is desired to be in bicarbonate rather than carbonate or hydrate form.

Furthermore, bicarbonate concentrations can adequately be maintained when there is an excess of carbon dioxide, by bicarbonate alkalinity in the range of 20 to 80 p.p.m., with an excess of carbon dioxide of about 2 to 10 p.p.m., but produces pH values in the range of about 6.5 to 7.2. The isoelectric point or point of minimum solubility, however, of aluminum hydroxide (which it is desired to precipitate) is about pH 6.0 to 7.0. Desirably, then, the pH of treated water (after the addition of alum and any primarily augmenting alkali) should be in this range. Thus, the addition of lime to obtain an adequate bicarbonate concentration for the reaction in Equation 1 may have a tendency of raising the pH of the raw water to a point so high that the desired precipitation of aluminum hydroxide will not occur to a sufficient extent and/or may inhibit the adsorptive properties of the precipitant particularly in color removal.

Quite apart from the effect of alkalinity in the reaction of Equation 1, the addition of chlorine may produce separate and distinct difficulties. Thus, chlorination which is desirable for a number of reasons in water treatment, has its own effect on alkalinity. The chemical reactions involved in the chlorination of water may be represented somewhat as follows:

(2) $\quad Cl_2 + H_2O \rightarrow HCl + HOCl$
(3) $\quad HOCl \rightarrow H^+ + OCl^-$
(4) $\quad 2HCl + Ca(HCO_3)_2 \rightarrow CaCl_2 + 2H_2O + 2CO_2$ From the above equations, it appears, that, for example, 1 p.p.m. applied chlorine forms 0.51 p.p.m. hydrochloric acid which, in turn, requires 0.71 p.p.m. bicarbonate alkalinity for neutralization. Thus, the application of 10 p.p.m. primary chlorine as could be in the excess-chlorine type of treatment would reduce the alkalinity of raw water by 7 p.p.m. and would add 0.63 p.p.m. carbon dioxide. Since it may be desired that, for corrosion inhibition, the alkalinity of the finished water should be at least 25 p.p.m. and preferably 35 to 40 p.p.m., the chlorination reaction would have an adverse effect.

According to this invention, however, it has been discovered that the aforementioned disadvantageous effects can be substantially controlled and the over all water treatment system enhanced by utilizing calcite—a finely ground crystalline carbonate, principally calcium carbonate—as a preferred material for controlling alkalinity, and, furthermore, that calcite has a synergistic effect in collecting and enhancing the efficiency of both chlorination and flocculation steps.

For example, a substantial drop in raw water alkalinity resulting from heavy dosages of chlorine is satisfactorily prevented or controlled by first reacting a concentrated suspension of calcite with a concentrated chlorine water solution prior to the introduction of either to the raw water. The reaction is indicated as follows:

(5) $\quad 2Cl_2 + 2H_2O + CaCO_3 \rightarrow$
$\quad\quad\quad CaCl_2 + H_2O + CO_2 + 2H + 2OCl^-$ As appears from the above, 1 p.p.m. chlorine would require 0.71 p.p.m. calcite, with the formation of 0.31 p.p.m. carbon dioxide. This amount, however, would deplete the natural calcium bicarbonate alkalinity of water.

Considering the carbon dioxide formed by the reaction of Equation 5 as also reacting with excess calcite present, the 1 p.p.m. chlorine reacts with 1.42 calcite, providing an increase in alkalinity of about 0.71 p.p.m. for each part of chlorine added, as indicated as follows:

(6) $\quad CO_2 + H_2O + CaCO_3 \rightarrow Ca(HCO_3)_2$

As will be understood, the reaction of Equation 5 may be expected to go substantially to completion, whereas the reaction of Equation 6 probably only goes part way to completion perhaps approximately 50%, thereby resulting in practical concentration adjustments to achieve the situation where 1 p.p.m. chlorine utilizes about 1 p.p.m. of calcite and raises the alkalinity about 0.3 to 0.4 p.p.m. Also, some of the carbon dioxide formed by the reaction of Equation 5 is undoubtedly given off to the atmosphere before it has time to react with excess calcite according to Equation 6. Similarly, also, some chlorine gas is volatilized and evolved in the course of these reactions.

Regarding the coagulant reaction of aluminum sulfate and calcite, it may be indicated as follows:

(7) $\quad Al_2(SO_4)_3 + 3CaCO_3 + 3H_2O \rightarrow$
$\quad\quad\quad 3CaSO_4 + 2Al(OH)_3 + 3CO_2$ Thus 1 p.p.m. of commercial alum requires about 0.5 p.p.m. calcite and forms 0.26 p.p.m. aluminum hydroxide and 3 molecules of carbon dioxide. 3 molecules of carbon dioxide then combining with excess calcite (instead of being evolved as a gas and lost) produces a situation where 1 p.p.m. aluminum sulfate reacts with 1 p.p.m. calcite, forming as their products of the reaction calcium sulfate, aluminum hydroxide and calcium bicarbonate. Actually, because of inevitable practical considerations, satisfactory results have been obtained considering that 1 p.p.m. alum reacts with or requires about 0.50 to 0.75 p.p.m. calcite.

The degree of completion of the various reactions is, of course, a function of the contact time between alum and calcite, the temperature of the solution suspension, as well as being a function of the fineness of the calcite particles. Thus, the finer the grind of calcite, the quicker will be the reaction, and the longer the contact time, the more complete will be the reaction. The reactions involved, also, occur quite slowly and almost inappreciably if alum and calcite are added separately to the raw water because the tremendous dilution of the chemicals markedly lowers the mass action effect. With mixing of only a few minutes, adding the two materials separately to raw water may result in more than 50% of the calcite dropping out ineffectively at the entrance to the sedimentation basin.

If, on the other hand, a solution of alum and a suspension of calcite are combined in normal proportions from commercial chemical feeding machinery (discharging of the order of 7 to 10 gallons per minute) the mass action conditions force the reactions to a rather advanced state. Mixing of the solutions prior to addition to the water for 10 or 15 minutes, for example, produces a copious aluminum hydroxide precipitate or floc with the size of each floc particle almost at its maximum obtainable. From the standpoint of water purification, however, this may not be desirable. That is, the function of the aluminum hydroxide precipitate is that of adsorbing color, iron, manganese and colloidal turbidity, and this adsorption begins most effectively when the floc particle is microscopic or sub-microscopic in size. The addition to raw water of maximum size floc particles actually reduces the efficiency of removal of the desired impurities, and may result in the heavy floc being broken up, peptized or dispersed into particles of smaller size which will not again readily reform into adsorptive precipitate particles of a size which will settle as desired and not penetrate or clog a filter bed through which the treated water is subsequently passed.

Preferably, then, a concentrated solution of alum is mixed with a concentrated suspension of calcite (each directly from an automatic feeding machine) and with agitation for a very short period of the order of about 30 seconds to two minutes so that the reaction is accomplished with the formation of only very fine floc particles. This mixture, then, is immediately added to the raw water and is there slowly agitated for a period of 20 to 30 minutes. In this way minute aluminum hydroxide or alum floc particles build up during agitation to large size but under circumstances where they have enhanced efficiency in adsorption of the desired impurities, and absorption or enmeshing of suspended matter including silt, micro-organisms, precipitated iron and the like.

As an additional advantage, it should be noted that the particles of calcite are hard and crystalline in nature. When treated according to this invention, about 50 percent of the particles are not completely dissolved either in the mixing or in addition to the raw water but remain as discrete calcite particles of microscopic or semi-microscopic size where they serve, as such, as nuclei for floc formation and as materials which will "weight" the floc to increase its specific gravity and increase the desired tendency and speed of settling out of the floc and its adsorbed and absorbed impurities. It is also believed that undissolved calcite which does not enter into the foregoing reactions has a deterring effect as a neutralizing agent to combine with dissolved or evolved carbon dioxide to decrease the extent to which such dissolved gases might tend to buoy up or float the floc and retard sedimentation.

Referring to the drawing, which shows a flow sheet type of representation for a water treatment plant embodying or for practicing this invention, there is illustrated the raw water entering the system at 10 and the various treating chemicals entering through the alum feeder 11, calcite feeder 12 and chlorinator 13. These pieces of apparatus are of conventional and well-known design. These three materials are then combined and/or mixed in a reaction chamber or crock 15, which may be of any suitable corrosion-resistant material and has satisfactorily been formed as a rubber lined 55-gallon steel drum, where the chlorine-calcite and alum-calcite reactions occur.

An agitator 16 is preferably provided to enhance the mixing and reaction and to insure that any flocculating precipitate which forms will remain of a small particle size without excessive agglomerating. A sensing venturi arrangement 20 is provided in the water line 21 to sense or measure the flow of water therethrough. A conventional flow controller and proportioning device is provided at 25 to detect the flow from venturi 20 and transmit proportioning control to the automatic feeders 11 and 12 and the chlorinator 13 as is indicated by the dotted lines in FIG. 1. Such apparatus and circuits are conventional and well-known and not further described here and are provided so that the feeding and proportioning of alum, calcite and chlorine are automatically controlled in accordance with the quantity of flow of raw water into the system througth venturi 20.

A feed pump 26 pumps the reaction mixture from chamber 15 through feed line 27 into the raw water in line 21 where it is mixed with the water as it passes to conventional spray aerators 30. Then the treated raw water is collected in a conventional trough indicated at 31 and is led into conventional flocculators 35. Flocculators 35 are essentially, a series of chambers in which the treated water is detained for some 20 or 30 minutes while being agitated slowly by paddle agitators 36 to complete the agglomeration of the floc particles and the adsorption thereby of the impurities it is desired to remove.

From the flocculators 35, the water passes to one or more sedimentation basins indicated at 38 where the floc precipitate settles, and thence to filters 39 for the final clarification. From the filters 39, the treated water drops to a conventional filtered water flume 40 and then to a conventional clear water basin 41, which is preferably provided with agitating and aerating apparatus (not shown) where a final adjustment of the chemical composition of the water is made as by adding as conventional, lime, sodium silicate, additional chlorine, and/or other corrosion retarding, etc., materials. This final chemical addition is indicated generally by a feeder 45 leading through feed line 46 into the clear water basin 41, from which the finally treated water passes to a finished water basin 48 and, thence, through line 49 into the distribution system. A further sensing venturi is indicated in line 49 at 50 to measure and detect the volume of finished water flow which sensing is received by an additional controller 51 and transmitted to regulate automatically the proportioning and feed rate of final chemical addition from feeder 45 as required by the volume of finished water being withdrawn from basin 48.

As will be understood, calcite is primarily calcium carbonate, the principal constituent of limestone. Satisfactory results according to this invention have been achieved using as the calcite component that obtained from highly calcareous limestone with relatively low silica and other insoluble components and, particularly, a ground calcite sold by Limestone Products Company, of Newton, New Jersey, under the name "Aqua Treat" which is understood to be air separated and ground so that about 95% passes a 325 mesh sieve.

Also, in connection with the foregoing description, it should be noted that, whereas the floc or precipitate referred to may be considered generally aluminum hydroxide, the floc actually produced according to this invention appears to be a much more complex substance. For example, it has been found that the sulfate and other ions in the water being treated decidedly influence the pH at which a desirably full-bodied highly adsorptive and tough floc will be produced. For example, whereas the isoelectric point for pure or commercial grade aluminum hydroxide has been determined within a very narrow pH range about 6.0 to 7.0, it has been found that the pH of water treated according to this invention, in order to obtain optimum effectiveness of coagulant impurity removal, should desirably be above 6.0 and, indeed, is preferably controlled to a fairly constant value within the range of pH 6.8 to 7.2. Also, the application of aluminum sulfate to natural water may depress the pH thereof in two ways: by lowering the natural alkalinity and by the formation of carbon dioxide which itself depresses pH. If the alum is applied to the raw water before aeration, it may be that the carbon dioxide formed is partly eliminated during aeration resulting in a higher pH than if the alum were applied following aeration, in which instance a substantial amount of carbon dioxide (perhaps 5 to 15 p.p.m.) will remain in solution during passage of the treated water through the sedimentation basin and filters. In any case, it is appadent that coagulant dosages may well be governed to a large extent by the effect on the pH of the water rather than being proportioned to the amount of color or other impurities which it is desired to remove unless the pH control, as explained heretofore, is achieved according to this invention with calcite materials.

It should also be noted that the formation of desirably adsorptive floc, after the original precipitation of aluminum hydroxide, is influenced, among other sources, by the type of nucleus upon which the floc particles agglomerate and, particularly, by the electrical charge of the cations and anions in the original nucleus—e.g., whether the nuclei are silt, artificial turbidity such as bentonite, other floc particles, undissolved calcite crystals, etc. Also, the role of the sulfate ion in floc agglomeration, may not now be completely understood, but it has been discovered that sulfates are a part of the complex substance which has been collectively referred to as floc.

It should also be noted that, particularly with water treatment plants designed without the special provision of separate flocculating basins such as 36, enhanced results are achieved according to this invention by utilizing the standard catch basin 31 which receives the effluent from spray aerates as a detention area where the water being treated may be held for a sufficient length of time for floc coagulation, the necessary agitation being inherently finished as a result of the spray aeration. In this connection, it should be recalled that agitator 16 is provided in the reaction chamber 15 to give violent agitation at the moment of mixing of the calcite and coagulant to prevent as much as possible build up of floc particles during the reaction and before addition to the raw water so that the precipitate actually added to the raw water comprises minute floc particles which later will perform the coagulation function. By the same token, the mechanical effect of spray aeration will have an inhibiting result in floc agglomeration so that, with proper control according to this invention, the basin 31 of the spray aerator is the first place in the system where agglomeration or coagulation of the floc particle is permitted to occur, as also will be understood, the additive materials are preferably retained in the chamber for no more than about 30 to 60 seconds, and are added therefrom to the raw water line immediately prior to spray aeration for the purpose, among others, of avoiding floc agglomeration until after the water is passed to a point in the system where detention with but mild agitation will provide the desired coagulation and consequent impurity removal.

Satisfactory results have been achieved by mechanically feeding and proportioning the chemicals into the reaction chamber, as noted in the drawing, or by a regular gravity feed. A suction blower or equivalent apparatus is preferably provided to remove from the reaction chamber any chlorine gas which may be volatized therein. Satisfactory results have been achieved by adding the various chemicals to the raw water under such circumstances that there is a lapse of about 2 to 4 minutes between chemical addition and entrance of the water into its flocculation detention apparatus, by, as noted, the provision of agitation in the reaction chamber, pumping through the raw water flume, and at spray aeration all intentionally preventing formation of floc particles of appreciable size during this period, as a result of which, increased floc formation appears to occur upon the entrance of the treated water into the first flocculator 36. Although the calcite preferred, as noted, is of about 325 mesh particle size, microorganic examination of the treated water discloses a substantial amount of the undissolved excess calcite has been reduced to particles of about half their original size during passage to the flocculator thereby forming the desired increased quantity of available nuclei to aid in floc agglomeration.

Satisfactory results are achieved, according to this invention, with calcite dosages being added to the raw water within the range of 25% to 75% of the coagulant dosage added, and a ratio of 50% to 75% is preferred. Within these ranges it has been found that the removal of color impurities (originally present at from 20 to 40 p.p.m.) is complete and that iron impurities, even if present in concentrations up to 5 p.p.m., is also complete. As will be understood, however, the greater the ratio of calcite to aluminum sulfate the higher will be the resulting pH of the treated water in the flocculators. Considering floc formation as instigated primarily by bicarbonate alkalinity the pH range may optionally be considered at 6.0 to 6.7 for a dosage of approximately 25 p.p.m. aluminum sulfate. It has been discovered in connection with this invention, however, that excellent floc formation is obtained at values as high as 7.3 which pH range can be obtained with an alum dosage of 20 to 25 p.p.m. plus 60 to 70% of calcite. Higher calcite ratios, of course, markedly enhance precipitation in view of the excess calcite present to serve as a weighting agent in the agglomerated floc.

As will be understood, of course, it may be desired to utilize other flocculating agents in place of or in addition to the alum described in the foregoing illustrative disclosure, with, of course, a calcite reactant for preliminary formation or reaction as described. As illustrative of other flocculating agents may be noted, for example, ferric chloride. This material, already known as a flocculating agent for the treatment of water in water purification systems of the character described, is also within the purview of this invention, and the efficiency thereof in both quantity and quality of floc formation is also enhanced by the combination therewith of an addition of calcite, as is the case with alum. Thus, the quality of flocculation with, for example, the addition of 40 p.p.m. ferric chloride is tremendously enhanced and time for appropriate flocculation tremendously decreased with the addition, for example, of 20 to 30 p.p.m. calcite. Actually, it has been found that the addition of no more than 15 p.p.m. calcite along with 30 p.p.m. ferric chloride produces tremendously enhanced characteristics of quality of flocculation and diminution of flocculating time as desired.

It should also be noted that the controlled reaction of calcite with flocculating materials, whether alum or iron salts or others, has been found to give satisfactory results even in water purification plants where alum alone for purification had previously been considered unsatisfactory, and has been found to give highly enhanced results in flocculation or coagulation in plants where conventional alum techniques have proved, at least, operable. It should also be understood that other coagulation or flocculation aids such as activated silica and the like, as presently utilized, may also be employed without detrimental results in the enhanced results of processes embodying and for practicing this invention and, that, also, additional alkali may be added, as is conventionally done with some systems, to raise the pH in extraordinary cases to a level for optimum flocculation in the water being treated. It should also be noted that any additional amount of "hardness" resulting in the water being treated from the addition of calcite thereto (and/or from the addition of a flocculating agent thereto) does not appreciably affect the desired purification and coagulation results, even with periods of extended detention in the several basins. Apparently this has to do with the law of mass action, and, of course, with the fact that reaction of the calcite and, for example, alum occurs in the mixing crock 15 without attributing a substantial or undesirably excessive amount of hardness to the water being treated as measured, for example, as additional calcium sulfate produced therein.

For example, when 10 g.p.l. alum and 10 g.p.l. calcite were added, it was found that, after 30 minutes contact time, the hardness (as calcium sulfate) amount to only 4900 p.p.m. which is only 98% of that which 10 g.p.l. alum alone would be expected to form, thus indicating that, whereas enhanced results in quality of floc and decrease of flocking time are experienced with the use of a calcite process embodying and for practicing this invention, still substantially no increase in water hardness of the treated water is experienced, as might otherwise be expected, by the intentional addition to the treated water of substantial proportions of calcite and/or a reaction product of calcite with the flocculating agent.

As will be understood, of course, there are some natural waters in this country (particularly, those stemming from the Great Lakes watersheds where a high limestone content is prevalent in the area) where the natural alkalinity may be in the range of, more or less, 80 to 120 p.p.m., as compared to a desirable range of natural alkalinity in raw water to be treated with various coagulants in the range of, generally, 35 to 65 p.p.m. Obviously, in instances of such excess alkalinity some different factors may be obtained in the application of the processes embodying the present invention to such raw water. For example, since alum (or other similar agglomerates or coagulants) reacts almost instantaneously with the alkalinity factor of raw water, it may well be that it is preferable to add alum, in some proportions, directly to the water to be treated ahead of any calcite addition, because, among other reasons, the alum will react with the natural alkalinity of the raw water to reduce the alkalinity thereof and, thereafter, the addition of calcite (perhaps 5 to 30 seconds after the addition of alum alone) will produce a situation whereby only a minor portion of the calcite will be dissolved so that there is a substantial pot of the added crystalline calcite available for enmeshment in the floc as a weighting agent. It should be noted, as will be understood, that the alum-calcite reaction is quite desirable, as disclosed, for addition to raw water of various degrees of alkalinity, but that, the additional effect of a weighting agent or nuclei forming agent for the floc may be additionally achieved, particularly in raw water of very high alkalinity, by a separate addition of calcite, since the alum-calcite added according to the foregoing suggested ranges, leaving only about half of the calcite to be active as a weighting agent.

In the past, a number of clays have been employed in water treatment programs as a weighting agent or a substance added to the water for the purpose of forming a large number of nuclei for floc formation thereover. Such a step has not, in all cases, given beneficial results—perhaps because such clays have a specific gravity of no more than 1.7 so that, as compared with the normal specific gravity of calcite of 2.7 the weighting agent function has been diminished. Additionally, apart from being, perhaps, too light for a good weighting agent, such clays are, frequently, too fine to enhance formation in treated water.

In such instances when a weighting agent is desired, it has been found that satisfactory results are achieved according to this invention if barium sulfate is used as a weighting agent to promote flocculation according to this invention. Barium sulfate, being almost completely insoluble in water, has a specific gravity of about 4.6, and, in sufficiently finely divided size, is a useful and satisfactory weighting agent for the flocculant precipitate produced by the alum or ferric chloride or other flocculating agent in conjunction with calcite.

While the processes and apparatus described herein constitute preferred embodiments of the invention, it is to be understood that the invention is not limited to these precise processes and apparatus and that changes may be made therein without departing from the scope of the invention as defined in the accompanying claims.

What is claimed is:

1. In a water purification procedure of the character described for removal of impurities from water by precipitation in a coagulated flocculant, the steps which comprise adding to said water to be purified a chemical flocculating agent in combination with finely divided calcite after reaction with said flocculating agent, said flocculating agent having a cation of the type which forms with said calcite a hydrous oxide gel flocculant precipitate and said finely divided calcite being added in an amount in excess of that which will react with said flocculating agent providing a source of finely divided and undissolved crystalline nuclei for enhancing the formation of coagulated floc, intimately admixing said added materials with said water to be treated for said precipitation, and retaining said thus treated water in a still pool for the agglomeration and coagulation of said flocculant precipitate to remove therefrom said impurities.

2. In a water purification procedure of the character described for removal of impurities from water by precipitation in a coagulated flocculant, the steps which comprise adding to said water to be purified a chemical flocculating agent in combination with a finely divided crystalline mineral after reaction with said flocculating agent, said agent being selected from the group consisting of alum and ferric chloride flocculants and mixtures thereof, said finely divided crystalline mineral being added in an amount in excess of that which will react with said flocculating agent providing a source of finely divided and undissolved crystalline nuclei for enhancing the formation of coagulated floc, intimately admixing said added materials with said water to be treated for said precipitation of said precipitate, mechanically agitating said admixture, and retaining said thus treated water in a still pool for the agglomeration and coagulation of said flocculant precipitate to remove therefrom said impurities.

3. In a water purification procedure of the character described for removal of impurities from water by precipitation in a coagulated flocculant, the steps which comprise adding to said water to be purified a chemical flocculating agent in combination with finely divided calcite for reaction with said flocculating agent, said agent being selected from the group consisting of alum and ferric chloride flocculants and mixtures thereof, reacting said calcite with said flocculating agent before addition to said water, said calcite being added in an amount in excess of that which will react with said flocculating agent providing a source of finely divided and undissolved crystalline nuclei for enhancing the formation of coagulated floc, and intimately admixing said added materials with said water to be treated for said precipitation of said precipitate.

4. In a water purification process of the character described for removal of impurities from water by precipitation in a coagulated flocculant, the steps which comprise admixing for reaction a flocculating agent, selected from the group consisting of alum and ferric chloride flocculants and mixtures thereof, and a finely divided crystalline mineral, maintaining said admixed materials in initimate contact for a predetermined time for chemical reaction therebetween, adding the reaction product of said admixed flocculating agent and crystalline mineral to said water to be purified, the amount of said crystalline mineral being in excess of that which completely reacts with said flocculating agent effecting direct addition to said water to be purified of finely divided crystalline mineral for providing flocculation and agglomeration nuclei for coagulation of a flocculant precipitate formed in said water by said added reaction product, and intimately admixing said reaction product and said excess crystalline mineral with said water to be purified for agglomeration and settling and precipitation of said precipiate.

5. In a water purification process of the character described for removal of impurities from water by precipitation in a coagulated flocculant, the steps which comprise admixing a flocculating agent and finely divided crystalline calcium carbonate, said flocculating agent being selected from the group consisting of alum and ferric chloride flocculants and mixtures thereof, maintaining said admixed materials in intimate contact with mechanical agitation for chemical reaction therebetween, adding the reaction product of said admixed flocculating agent and crystalline calcium carbonate to said water to be purified, the amount of said crystalline calcium carbonate being in excess of that which completely reacts with said flocculating agent effecting direct addition to said water to be purified of finely divided crystalline calcium carbonate for providing flocculation and agglomeration nuclei for coagulation of a flocculant precipitate formed in said water by said added reaction product, and intimately admixing said reaction product and said excess crystalline calcium carbonate with said water to be purified with mechanical agitation for agglomeration and settling and precipitation of said precipitate.

6. In a water purification process of the character described for removal of impurities from water by precipitation in a coagulated flocculant, the steps which comprise admixing for reaction a flocculating agent and finely divided calcite, said flocculating agent being selected from the group consisting of alum and ferric chloride flocculants and mixtures thereof, maintaining said admixed materials in intimate contact with mechanical agitation for a predetermined time for chemical reaction therebetween, adding the reaction product of said admixed flocculating agent and calcite to said water to be purified, the amount of said calcite being in excess of that which completely reacts with said flocculating agent effecting direct addition to said water to be purified of finely divided calcite for providing flocculation and agglomeration nuclei for coagulation of a flocculant precipitate formed in said water by said added reaction product, intimately admixing said reaction product and said excess calcite with said water to be purified, and thereafter retaining said thus treated water in a substantially still pool for agglomeration and settling and precipitation of said coagulated flocculant precipitate.

7. In a water purification process of the character described for removal of impurities from water by precipitation in a coagulated flocculant, the steps which comprise adding to said water to be purified a chemical flocculating agent in combination with a finely divided calcite material for reaction with said flocculating agent, said calcite material being added in excess of the amount which reacts with said flocculating agent and said flocculating agent having a cation which forms with said calcite a hydrous oxide gel flocculant precipitate, intimately admixing said added materials with said water to be treated for said precipitation of said precipitate, additionally adding to said treated water another insoluble finely divided mineral material as a weighting agent for said flocculant precipitate and essentially inert and non-reactive with said flocculating agent and said calcite mineral for enhancing the precipitation and settling out of said flocculant precipitate, and retaining said thus treated water in a still pool for agglomeration and coagulation of said flocculant precipitate and said weighting agent to remove from said water said impurities.

8. In a water purification process of the character described for removal of impurities from water by precipitation in a coagulated flocculant, the steps which comprise adding to said water to be purified a chemical flocculating agent and finely divided calcite for reaction therein, said calcite being added in substantial excess of the amount thereof which reacts with said flocculating agent and said flocculating agent being selected from the group consisting of alum and ferric chloride flocculants and mixtures thereof, additionally adding to said thus treated water finely divided barium sulfate as a weighting agent to form a plurality of nuclei for coagulation and agglomeration of said flocculant precipitate, intimately admixing said added materials with said water to be treated, and retaining said thus treated water for agglomeration and coagulation of said flocculant precipitate on said barium sulfate nuclei for removal from said water of said impurities therein.

References Cited in the file of this patent

UNITED STATES PATENTS

| | | |
|---|---|---|
| 354,650 | Morrison et al. | Dec. 21, 1886 |
| 1,535,709 | Booth | Apr. 28, 1925 |
| 1,619,036 | Ravnestad | Mar. 1, 1927 |
| 1,930,792 | Evans | Oct. 17, 1933 |
| 2,234,285 | Schworm et al. | Mar. 11, 1941 |
| 2,310,009 | Baker et al. | Feb. 2, 1943 |
| 2,326,395 | Samuel | Aug. 10, 1943 |
| 2,362,409 | Samuel | Nov. 7, 1944 |

FOREIGN PATENTS

| | | |
|---|---|---|
| 891,625 | France | Dec. 11, 1943 |

OTHER REFERENCES

"Principles of Industrial Waste Treatment," by C. Fred Gurnham, John Wiley and Sons, Inc., New York (1955), pages 226 to 228.

Chemical Abstracts, vol. 50, col. 2900–2901.